United States Patent [19]

Bartkowiak et al.

[11] Patent Number: 5,299,144
[45] Date of Patent: Mar. 29, 1994

[54] ARCHITECTURE FOR COVARIANCE MATRIX GENERATION

[75] Inventors: John G. Bartkowiak; Michael A. Nix, both of Austin, Tex.

[73] Assignee: Advanced Micro Devices, Inc., Sunnyvale, Calif.

[21] Appl. No.: 900,000

[22] Filed: Jun. 17, 1992

[51] Int. Cl.⁵ .................. G06F 7/38; G06F 15/336
[52] U.S. Cl. .................. 364/715.01; 364/728.03; 364/728.07
[58] Field of Search .......... 364/715.01, 724.01, 364/724.07, 724.08, 724.09, 724.1, 724.05, 724.13, 724.19, 728.01, 728.02, 728.03, 728.07

[56] References Cited

U.S. PATENT DOCUMENTS

| | | | |
|---|---|---|---|
| 4,544,919 | 10/1985 | Gerson | 364/724.15 |
| 4,545,025 | 10/1985 | Hepner et al. | 364/728.03 |
| 5,007,007 | 4/1991 | van Zanten et al. | 364/724.19 X |

Primary Examiner—Jerry Smith
Attorney, Agent, or Firm—Foley & Lardner

[57] ABSTRACT

The present invention provides an apparatus and method for generating a covariance matrix. According to one aspect of the invention, an apparatus is provided which generally includes a memory, a circular buffer, a multiply-accumulator, and an arithmetic logic unit. The memory contains an array of values representative of a plurality of samples, and the circular buffer is configured to provide a predetermined number of memory locations. A method for generating the covariance matrix is further provided which uses the architecture listed above to efficiently generate a covariance matrix based on the values in the memory. In one aspect of the invention, the method provides that the memory, the circular buffer, the multiply-accumulator, and the arithmetic logic unit, all operate in parallel to fully exploit the resources provided by the architecture.

14 Claims, 15 Drawing Sheets

11 X 11 VSELP COVARIANCE MATRIX

| 0,0 | 0,1 | 0,2 | 0,3 | 0,4 | 0,5 | 0,6 | 0,7 | 0,8 | 0,9 | 0,10 |
|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 |
| 2,0 | 2,1 | 2,2 | 2,3 | 2,4 | 2,5 | 2,6 | 2,7 | 2,8 | 2,9 | 2,10 |
| 3,0 | 3,1 | 3,2 | 3,3 | 3,4 | 3,5 | 3,6 | 3,7 | 3,8 | 3,9 | 3,10 |
| 4,0 | 4,1 | 4,2 | 4,3 | 4,4 | 4,5 | 4,6 | 4,7 | 4,8 | 4,9 | 4,10 |
| 5,0 | 5,1 | 5,2 | 5,3 | 5,4 | 5,5 | 5,6 | 5,7 | 5,8 | 5,9 | 5,10 |
| 6,0 | 6,1 | 6,2 | 6,3 | 6,4 | 6,5 | 6,6 | 6,7 | 6,8 | 6,9 | 6,10 |
| 7,0 | 7,1 | 7,2 | 7,3 | 7,4 | 7,5 | 7,6 | 7,7 | 7,8 | 7,9 | 7,10 |
| 8,0 | 8,1 | 8,2 | 8,3 | 8,4 | 8,5 | 8,6 | 8,7 | 8,8 | 8,9 | 8,10 |
| 9,0 | 9,1 | 9,2 | 9,3 | 9,4 | 9,5 | 9,6 | 9,7 | 9,8 | 9,9 | 9,10 |
| 10,0 | 10,1 | 10,2 | 10,3 | 10,4 | 10,5 | 10,6 | 10,7 | 10,8 | 10,9 | 10,10 |

FIG. 1A

MEMORY STORAGE

| 0 | 1 | 3 | 6 | 10 | 15 | 21 | 28 | 36 | 45 | 55 |
|---|---|---|---|---|---|---|---|---|---|---|
| * | 2 | 4 | 7 | 11 | 16 | 22 | 29 | 37 | 46 | 56 |
| * | * | 5 | 8 | 12 | 17 | 23 | 30 | 38 | 47 | 57 |
| * | * | * | 9 | 13 | 18 | 24 | 31 | 39 | 48 | 58 |
| * | * | * | * | 14 | 19 | 25 | 32 | 40 | 49 | 59 |
| * | * | * | * | * | 20 | 26 | 33 | 41 | 50 | 60 |
| * | * | * | * | * | * | 27 | 34 | 42 | 51 | 61 |
| * | * | * | * | * | * | * | 35 | 43 | 52 | 62 |
| * | * | * | * | * | * | * | * | 44 | 53 | 63 |
| * | * | * | * | * | * | * | * | * | 54 | 64 |
| * | * | * | * | * | * | * | * | * | * | 65 |

FIG. 1B

F [0] [i] [k] MATRIX

| 0 | 1 | 3 | 6 | 10 | 15 | 21 | 28 | 36 | 45 |
|---|---|---|---|----|----|----|----|----|----|
| * | 2 | 4 | 7 | 11 | 16 | 22 | 29 | 37 | 46 |
| * | * | 5 | 8 | 12 | 17 | 23 | 30 | 38 | 47 |
| * | * | * | 9 | 13 | 18 | 24 | 31 | 39 | 48 |
| * | * | * | * | 14 | 19 | 25 | 32 | 40 | 49 |
| * | * | * | * | *  | 20 | 26 | 33 | 41 | 50 |
| * | * | * | * | *  | *  | 27 | 34 | 42 | 51 |
| * | * | * | * | *  | *  | *  | 35 | 43 | 52 |
| * | * | * | * | *  | *  | *  | *  | 44 | 53 |
| * | * | * | * | *  | *  | *  | *  | *  | 54 |

B [0] [i] [k] MATRIX

| 2 | 4 | 7 | 11 | 16 | 22 | 29 | 37 | 46 | 56 |
|---|---|---|----|----|----|----|----|----|----|
| * | 5 | 8 | 12 | 17 | 23 | 30 | 38 | 47 | 57 |
| * | * | 9 | 13 | 18 | 24 | 31 | 39 | 48 | 58 |
| * | * | * | 14 | 19 | 25 | 32 | 40 | 49 | 59 |
| * | * | * | *  | 20 | 26 | 33 | 41 | 50 | 60 |
| * | * | * | *  | *  | 27 | 34 | 42 | 51 | 61 |
| * | * | * | *  | *  | *  | 35 | 43 | 52 | 62 |
| * | * | * | *  | *  | *  | *  | 44 | 53 | 63 |
| * | * | * | *  | *  | *  | *  | *  | 54 | 64 |
| * | * | * | *  | *  | *  | *  | *  | *  | 65 |

C [0] [i] [k] MATRIX

| 1 | 3 | 6 | 10 | 15 | 21 | 28 | 36 | 45 | 55 |
|---|---|---|----|----|----|----|----|----|----|
| * | 4 | 7 | 11 | 16 | 22 | 29 | 37 | 46 | 56 |
| * | * | 8 | 12 | 17 | 23 | 30 | 38 | 47 | 57 |
| * | * | * | 13 | 18 | 24 | 31 | 39 | 48 | 58 |
| * | * | * | *  | 19 | 25 | 32 | 40 | 49 | 59 |
| * | * | * | *  | *  | 26 | 33 | 41 | 50 | 60 |
| * | * | * | *  | *  | *  | 34 | 42 | 51 | 61 |
| * | * | * | *  | *  | *  | *  | 43 | 52 | 62 |
| * | * | * | *  | *  | *  | *  | *  | 53 | 63 |
| * | * | * | *  | *  | *  | *  | *  | *  | 64 |

FIG. 1C

ARCHITECTURE FOR COVARIANCE MATRIX GENERATION

FIELD OF THE INVENTION

The present invention relates to a CMOS integrated circuit, and more particularly to a method and apparatus for generating a covariance matrix.

BACKGROUND OF THE INVENTION

A multitude of applications include processes which require a step of measuring the variation between sets of random variables. These measurements may be stored or displayed in the form of a two-dimensional array. Such arrays are hereinafter referred to as covariance matrices.

One example of an application which requires the generation of a covariance matrix is the implementation of the IS-54 US Digital Cellular Radio Standard. This standard uses a speech coder known as Vector Sum Excited Linear Predictive Coding (VSELP), which requires the computation of a covariance matrix using as input a block of digital speech samples. The speech samples are stored at an 8 KHz sampling rate from an analog input. The details of the IS-54 Standard are discussed in EIA/TIA Document 2215 (Cellular System - Dual Mode Mobile Station/One State Compatibility Standard IS-54, December 1989).

The formula to generate a covariance matrix from 170 input speech samples is shown in Equation 1, where $\phi(i,k)$ represents the value at row i, column k, of the covariance matrix, $N_A$ represents the total number of input speech samples ($N_A = 170$), $N_P$ represents the maximum row and column number of the covariance matrix ($N_P = 10$), and $S(x)$ represents the value of the xth input sample.

$$\phi(i,k) = \sum_{n=N_p}^{N_A-1} S(n-i)S(n-k) \quad (1)$$

A representation of a covariance matrix generated by Equation 1 is shown in FIG. 1A, where x,y represents the covariance measurement stored at row x, column y, of the covariance matrix.

FIG. 1B shows a possible method of storing the values of the covariance matrix shown in FIG. 1A in Random Access Memory (RAM). Note that only 66 RAM locations are needed to store an 11 by 11 covariance matrix, since a covariance matrix is symmetric. Thus, for every element $\phi(i,k)$ in a covariance matrix, $\phi(i,k) = \phi(k,i)$. As a result, only the elements across the main diagonal and upper (or lower) triangle of a covariance matrix need be generated and stored to represent the entire covariance matrix.

FIG. 1C shows the storage configurations for three matrices, F, B, and C, which are subsets of the covariance matrix stored as shown in FIG. 1B. These three matrices are also symmetric.

Equation 1 displays redundancy in that if the row 0 elements of a covariance matrix (i.e. $\phi(0,0)$ to $\phi(0,10)$) are generated, the remaining elements can be easily generated using Equation 2 shown below:

$$\phi(i+1, k+1) = \phi(i,k) + S(N_p-i-1)S(N_p-k-1) - S(N_A-i-1)S(N_A-k-1) \quad (2)$$

The following equations show the derivation of Equation 2 for $\phi(1,1)$.

$$\phi(0,0) = S(10)S(10) + S(11)S(11) + \ldots + S(169)S(169)$$

$$\phi(1,1) = S(9)S(9) + S(10)S(10) + \ldots + S(168)S(168)$$

Therefore, $$\phi(1,1) = \phi(0,0) + S(9)S(9) - S(169)S(169).$$

The implementation of Equation 2 is generally straightforward using multiply-accumulate hardware.

However, the row 0 elements (i.e. $\phi(0,0)$ to $\phi(0,10)$) of a covariance matrix must first be generated by Equation 1 before the remainder of the matrix is generated by Equation 2.

The operands in the multiplications required by Equation 1 are samples offset from each other by a fixed number. For example, the formula to generate $\phi(0,1)$ is $$\phi(0,1) = S(10)S(9) + S(11)S(10) + \ldots + S(169)S(168).$$

In this example, the operands of every multiplication are samples offset from each other by one.

According to the prior art, to efficiently implement an equation having the form of Equation 1, a covariance matrix generator must include either two separate memories containing the 170 speech samples, or a pipeline on one memory containing the 170 samples. Block diagrams of these architectures are shown respectively in FIGS. 2 and 3.

Pipelining is a form of processing in which a functional unit performs its process in several steps. When the first step is completed, the results are passed to a second step that uses separate hardware. The first-step hardware is thus free to begin processing new data. While pipeline processing generally provides fast throughput for sequential processes, it is typically used for processes in which the time required to pass through some functional unit of a computer system would otherwise be longer than the intervals at which data may enter that functional unit.

The dual-memory architecture shown in FIG. 2 has the obvious disadvantage that it requires twice as much memory as the pipeline architecture shown in FIG. 3. However, when a covariance matrix generator employing the pipeline architecture shown in FIG. 3 generates, for example, $\phi(0,10)$, a 10 level pipeline is required. Such a pipeline provides for fast covariance matrix generation, but its purpose is uniquely confined to generating a covariance matrix. Such pipelines are not useful (in any obvious manner) for other calculations, such as, for example, the other parts of the computational requirement for VSELP.

Therefore, it is clearly desirable to provide an efficient covariance matrix generator that is easily used as a general purpose result store but which does not require the samples upon which the matrix is based to be stored in two banks of memory.

It is further desirable to provide a covariance matrix generator that efficiently implements covariance calculations at low hardware cost and supplies a useful "scratch pad" memory in the system for other calculations to store temporary results.

SUMMARY OF THE INVENTION

According to one aspect of the invention, an apparatus is provided for generating a first row of a covariance matrix. The apparatus generally includes a memory containing an array of values representative of a plurality of samples, a circular buffer coupled to the memory, the circular buffer being configured to provide a predetermined number of memory locations, and a multiply-accumulator coupled to the first memory and the circular buffer.

According to another aspect of the invention, an apparatus is provided for generating an upper or lower triangular portion of a covariance matrix. The apparatus generally comprises first and second memories, a circular buffer coupled to the first memory, a multiply-accumulator coupled to the first and second memories and the circular buffer, and an arithmetic logic unit coupled to the second memory and the multiply-accumulator. The first memory contains an array of values representative of a plurality of samples. The circular buffer is initially configured to provide a first predetermined number of memory locations.

The apparatus transmits a sequential subset of the array of values from the first memory to the multiply-accumulator to generate a first element of the first row of the covariance matrix, and stores the first element of the first row of the covariance matrix in the second memory.

The apparatus simultaneously transmits to the multiply-accumulator a first series of sequential subsets of the array of values from the first memory, and a second series of sequential subsets of the array of values from the circular buffer, to generate in the output of the multiply-accumulator the remaining elements of the first row of the covariance matrix. The apparatus stores the remaining elements of the first row of the covariance matrix in the second memory.

The apparatus is further configured to generate in the arithmetic logic unit, and store in the second memory, the remaining elements of the upper or lower triangular portion of the covariance matrix.

The invention further provides a method of generating a covariance matrix. The method includes the steps of providing a memory containing an array of values representative of a plurality of samples, providing a multiply-accumulator, providing a circular buffer with a predetermined depth, and generating a first element of a first row of the covariance matrix in the multiply-accumulator. The method further includes the steps of storing the first element in a second memory, generating the remaining elements of the first row of the covariance matrix, and storing the remaining elements of the first row in the second memory. The method further includes the steps of generating, diagonal by diagonal, the remaining elements of the upper or lower triangular portion of the covariance matrix in an arithmetic logic unit, and storing in the second memory the remaining elements of the upper or lower triangular portion of the covariance matrix.

BRIEF DESCRIPTION OF THE DRAWINGS

The invention will hereafter be described with reference to the accompanying drawing, wherein like numerals denote like elements and:

FIG. 1A depicts an 11 by 11 covariance matrix where each coupled pair of numbers X,Y represents the value of the element at row X, column Y, of the covariance matrix;

FIG. 1B depicts how an 11 by 11 covariance matrix may be stored in memory as a result of its symmetric property;

FIGS. 1C depicts symmetric submatrices of the covariance matrix depicted in FIG. 1B;

DETAILED DESCRIPTION OF THE PREFERRED EMBODIMENT

Figure 3:
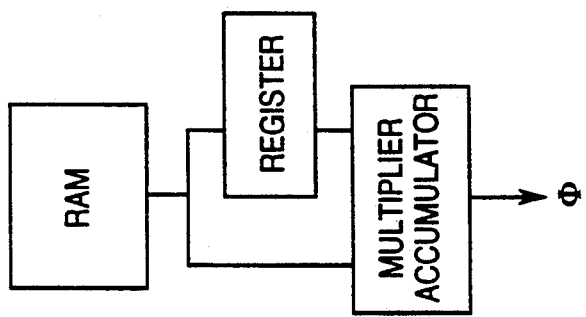
FIG. 3 is a block diagram of a covariance matrix generator having a register pipeline on one memory.
Figure 2:
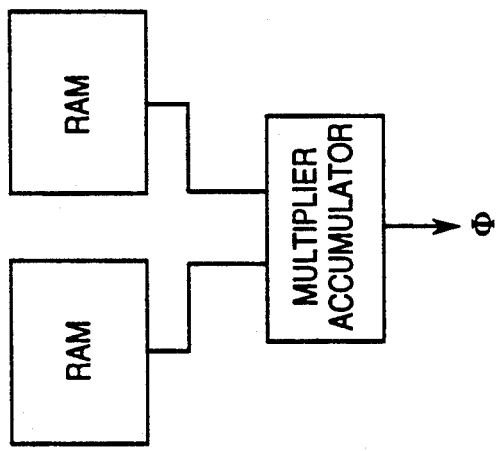
FIG. 2 is a block diagram of a covariance matrix generator which stores sample values in two separate memories.
Figure 4:
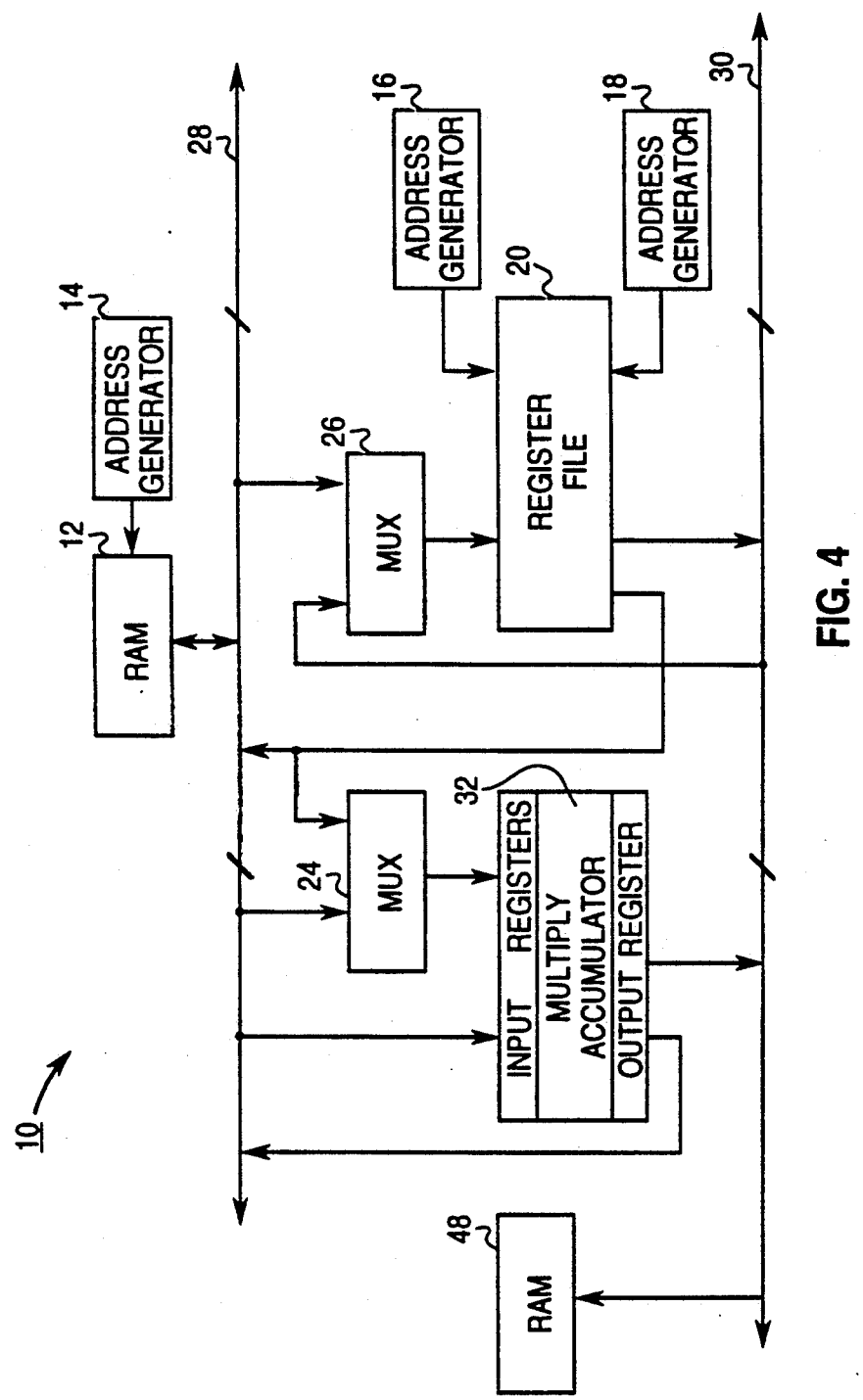
FIG. 4 is a block diagram of a covariance matrix generator according to one aspect of the present invention.

Referring to FIG. 4, a covariance matrix generator 10 is shown according to a preferred exemplary embodiment of the present invention. Generator 10 generally includes a plurality of random access memories (RAMs) 12 and 48, a plurality of address generators 14, 16 and 18, a dual-port register file 20, and a plurality of multiplexers 24 and 26. Generator 10 further includes two data busses 28 and 30, and a multiply accumulator (hereinafter MAC) 32.

MAC 32 is a three-level pipeline and has two input ports and an output port. Specifically, three cycles after two operands have been applied to the input ports of MAC 32, the product of a multiply or multiply-accumulate of the operands will be available at its output port. This architecture minimizes the hardware structure of MAC 32 and imposes a penalty of 3 clock cycles on the computation time of a single multiply-accumulate operation. However, since each covariance measurement of a 170 sample set requires 160 multiply-accumulate calculations (see Equation 1), the percentage increase in computational time of MAC 32 over a single-cycle multiply accumulator is less than 2 percent.

Address generator 18 is the "read" address generator of register file 20, and address generator 16 is the "write" address generator of register file 20. The method of evaluating Equation 1 using generator 10 employs register file 20 as a circular buffer with a depth of 10 locations. Address generators 16 and 18 are configured to allow their respective address pointers to "wrap-around" to a given start address (location 0) when a limit address (location 9) has been reached. For example, if the pointer of address generator 16 is incremented when pointing at location 9 of register file 20, then the pointer resets or "wraps around" to point to location 0 of register file 20. Likewise, if the pointer of address generator 16 is decremented when pointing at location 0 of register file 20, then the pointer "wraps around" to point at location 9 of register file 20. The pointer of address generator 18 is configured to "wrap around" in a like manner.

One input to MAC 32 is directly applied by data bus 28, while the other is controlled by multiplexer 24. Multiplexer 24 is initially configured to direct data from data bus 28 to the input of MAC 32 which it controls. Multiplexer 26 controls the input to register file 20, and is initially configured to direct data from data bus 28 to the location in register file 20 pointed at by address generator 16.

Figure 5:
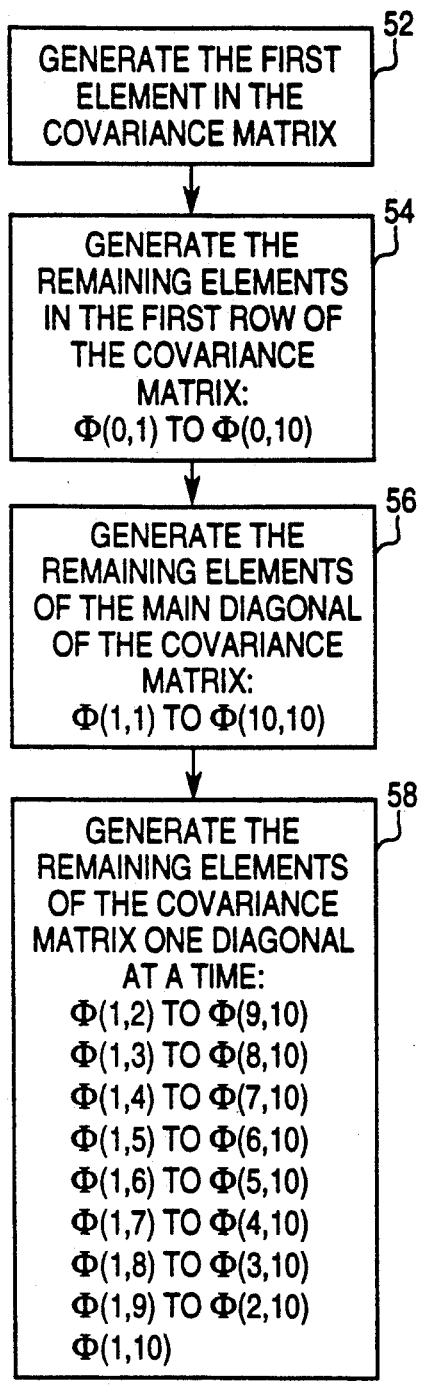
FIG. 5 is a flowchart of the operation of a covariance matrix generator according to one aspect of the present invention.

The generation of a covariance matrix may be implemented in accordance with steps 52, 54, 56, and 58 shown in FIG. 5. Steps 52 and 54 will be described with reference to generator 10, while steps 56 and 58 will be described with reference to an expanded generator which will be described in detail below with reference to FIG. 9. Specifically, in step 52, the element at row 0, column 0 of the covariance matrix, $\phi(0,0)$, is generated. In step 54, the measurements to complete the first row (row 0) of the covariance matrix, $\phi(0,1)$ to $\phi(0,10)$, are generated. In step 56, the elements of the main diagonal of the matrix, $\phi(1,1)$ to $\phi(10,10)$ are generated, and in step 58 the remaining elements of the matrix are generated. Each of these steps will be described in greater detail below with reference to FIGS. 7-11B.

Figure 7:
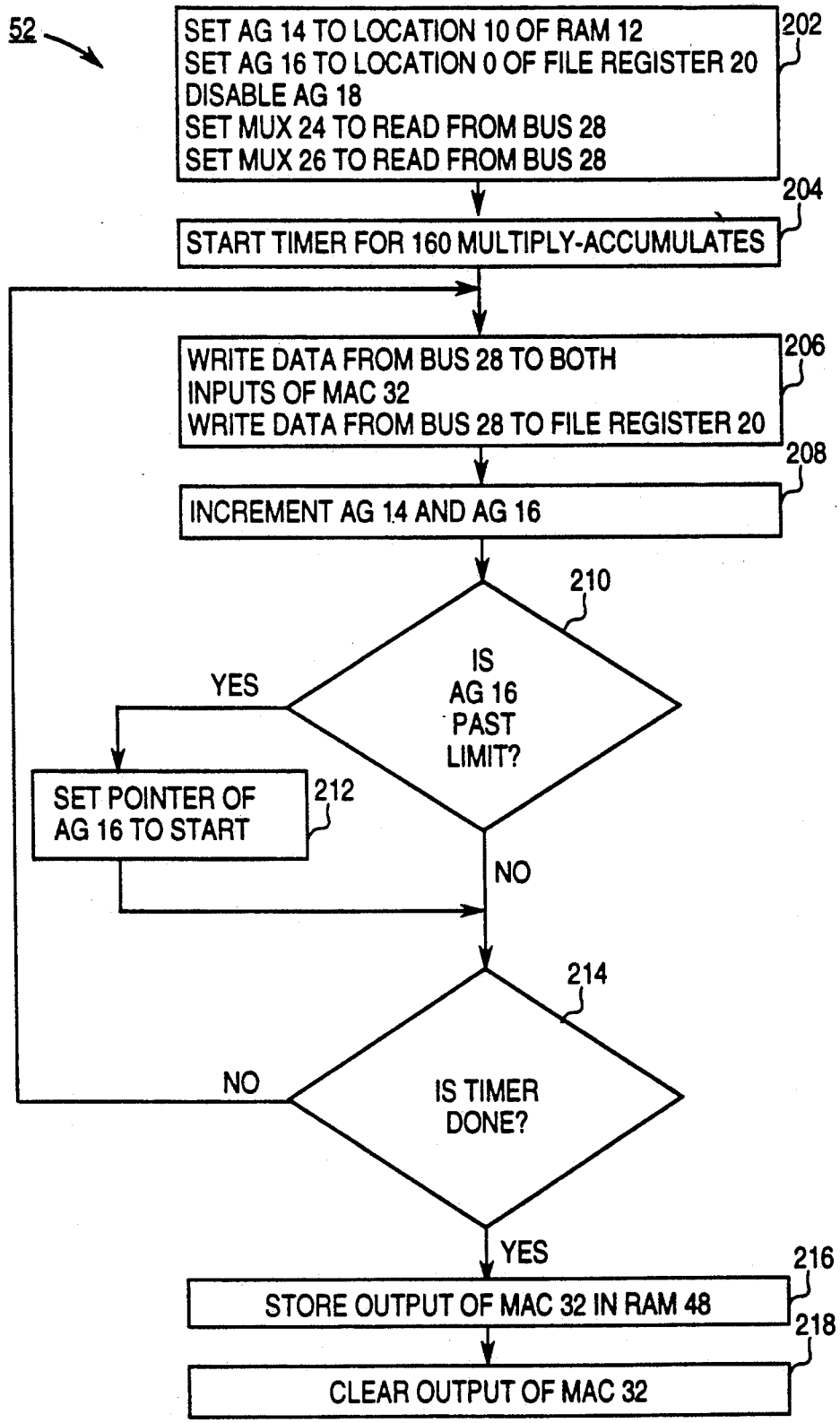
FIG. 7 is a flowchart of the process for generating the first element of a first row of a covariance matrix.

As mentioned above, in step 52, generator 10 first generates the $\phi(0,0)$ parameter of a covariance matrix according to Equation 1. The flow chart for the implementation of step 52 is shown in FIG. 7. Specifically, in step 202, address generator 14, which is the address generator for RAM 12, is set to point at location 10 of RAM 12, address generator 16 is set to point at location 0 of register file 20, and address generator 18 is disabled. Multiplexers 24 and 26 are configured to accept data from data bus 28. Thus initialized, generator 10 is configured to allow data from RAM 12 to be directed into both inputs of MAC 32 via data bus 28.

In step 204, a timer is started to provide 160 multiply-accumulates, and steps 206 to 214 are repetitively executed until the 160 multiply-accumulates have occurred.

In step 206, the sample at the position in RAM 12 at which address generator 14 points is input into both inputs of MAC 32 and written to file register 20. MAC 32 multiplies the input values and adds the product of the multiply to the sum of previous calculations. In step 208, address generators 14 and 16 increment in synchronism.

Accordingly, address generator 14 will successively point to addresses 10 through 169 of RAM 12, which contain values S(10) through S(169) respectively. As noted earlier, the pointer of address generator 16 is configured to wrap around. Thus, in steps 210 and 212, as address generator 16 increments, its pointer will wrap around to location 0 after pointing to location 9. After each "wrap around," the new data written into register file 20 will overwrite the data previously stored there.

During the iteration of steps 206 to 214, data samples S(10) through S(169) are fed into the input ports of MAC 32, are multiplied by themselves, and are accumulated with the results of previous calculations, to produce the final result $\phi(0,0)$. At the same time, S(10) to S(169) are successively written into register file 20. As register file 20 is configured to write into only ten memory locations, only the last ten input values will be stored therein. Therefore, when 160 multiply-accumulates are completed, the output of MAC 32 contains $\phi(0,0)$, and register file 20 is configured as shown, where X represents the location in register file 20 at which the respective address generators point (in this case, address generator 18 is disabled and address generator 16 points at location 9):

| ADDRESS | AG18 | AG16 | DATA VALUE [S()] |
|---|---|---|---|
| 0 | | | S(160) |
| 1 | | | S(161) |
| 2 | | | S(162) |
| 3 | | | S(163) |
| 4 | | | S(164) |
| 5 | | | S(165) |
| 6 | | | S(166) |
| 7 | | | S(167) |
| 8 | | | S(168) |
| 9 | | X | S(169) |

In step 216 the output of MAC 32 (i.e. $\phi(0,0)$) is stored in RAM 48 via data bus 30, and in step 218 the output register of MAC 32 is cleared. Address generator 14 is now pointing at S(169) in location 169 of RAM 12, and address generator 16 is pointing at location 9 of register file 20, which also contains S(169).

Rather than generate the other 10 terms on the main diagonal of the covariance matrix (i.e. $\phi(1,1)$ to $\phi(10,10)$) according to Equation 2 above, advantage is taken of the present configuration of register file 20 to generate the other 10 elements of row 0 (i.e. $\phi(0,1)$ to $\phi(0,10)$) of the covariance matrix (step 54).

Figure 8A:
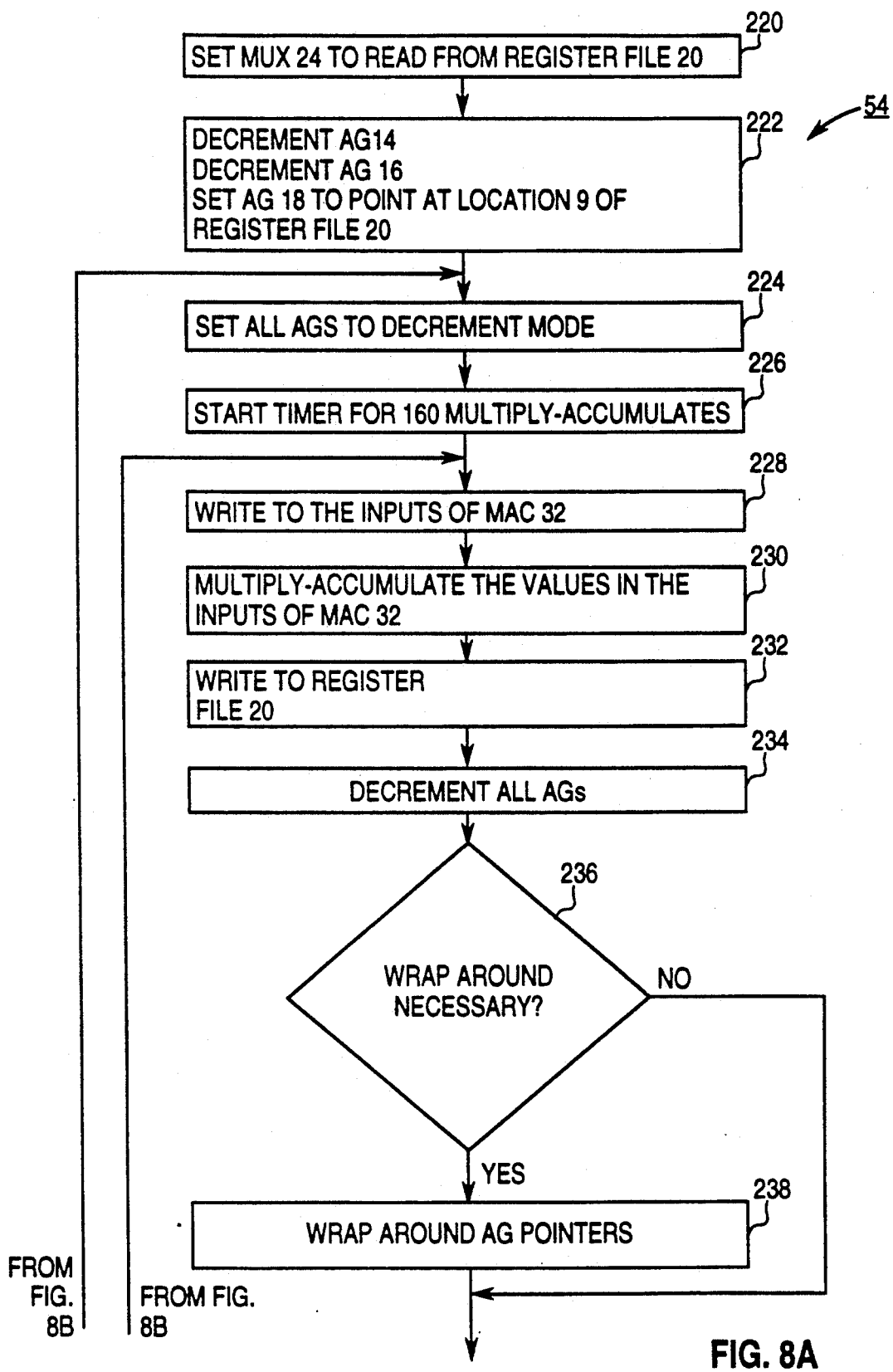
FIGS. 8A–8C are a flowchart of the process for generating the remaining elements of the first row of the covariance matrix.
Figure 8B:
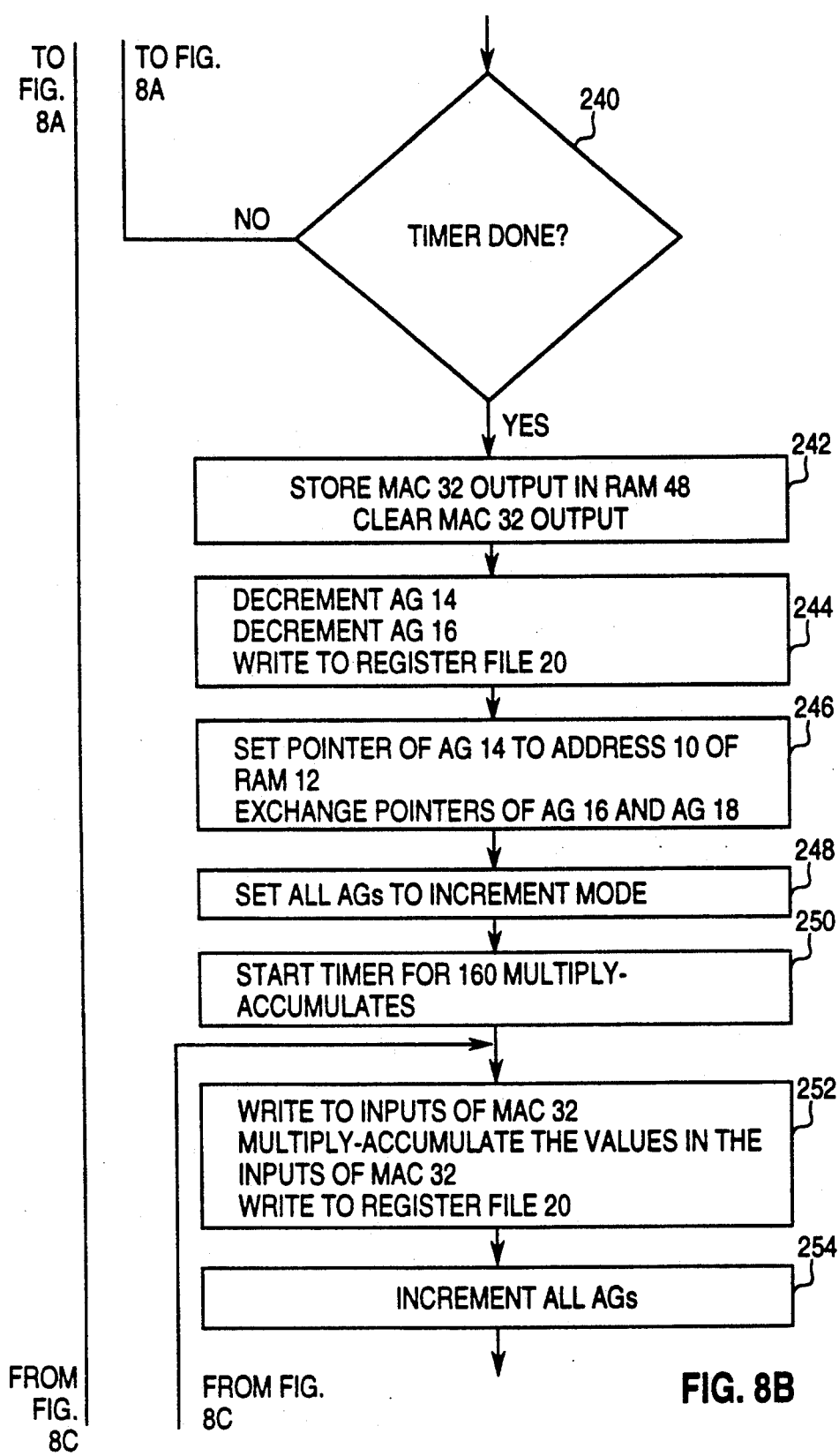
Figure 8C:
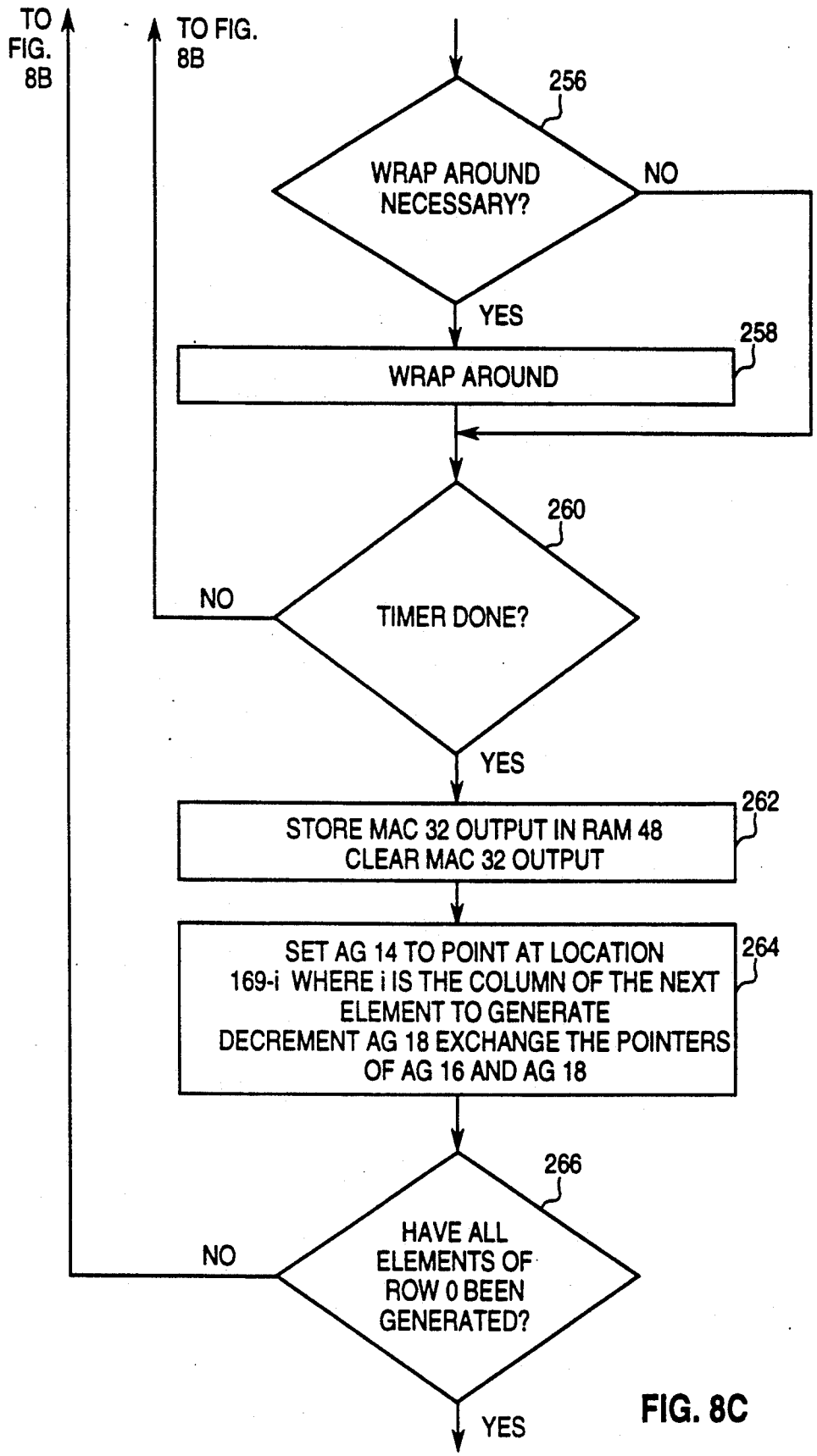

The implementation of step 54, a flow chart for which is shown in FIGS. 8A to 8C, will now be described in greater detail. To begin the generation of $\phi(0,1)$, in step 220 multiplexer 24 is configured to read from register file 20. Thus, one input to MAC 32 is now from register file 20 while the other input to MAC 32 is still from RAM 12.

Similar to the generation of $\phi(0,0)$, the generation of each of the elements of row 0 requires 160 multiply-accumulates. However, the operands of the multiplies required for these calculations are misaligned. More specifically, for every covariance element $\phi(0,k)$, the operands of the multiplies required to generate $\phi(0,k)$ are offset by k samples. For example, the operands of the multiplies required to generate $\phi(0,1)$ are offset by 1 sample (e.g. S(10)S(9), S(11)S(10), etc.) Consequently, to provide for this offset in the generation of $\phi(0,1)$, in step 222 address generator 14 is realigned to point at location 168 in RAM 12, and address generator 16 is realigned to point at location 8 in register file 20 (i.e. address generators 14 and 16 are decremented). Address generator 18 is set to point at location 9 of register file 20. Register file 20 is now configured as shown below:

| ADDRESS | AG18 | AG16 | DATA VALUE [S()] |
|---|---|---|---|
| 0 | | | S(160) |
| 1 | | | S(161) |
| 2 | | | S(162) |
| 3 | | | S(163) |
| 4 | | | S(164) |
| 5 | | | S(165) |
| 6 | | | S(166) |
| 7 | | | S(167) |

-continued

| ADDRESS | AG18 | AG16 | DATA VALUE [S()] |
|---------|------|------|------------------|
| 8       |      | X    | S(168)           |
| 9       | X    |      | S(169)           |

Thus, to begin generating $\phi(0,1)$, address generator 14 points at location 168 in RAM 12 which holds the value S(168), address generator 16 points at location 8 in register file 20 which holds the value S(168), and address generator 18 points at location 9 of register file 20 which holds the value S(169). Consequently, the values S(168) from data bus 28 and S(169) from location 9 in register file 20 are initially loaded into the input ports of MAC 32.

In step 224, address generators 14, 16, and 18 are placed in the decrement mode. As multiplexer 26 is still directing data from data bus 28 to the write port of register file 20 addressed by address generator 16, the write port of register file 20 has as input S(168) from data bus 28.

Figure 6:
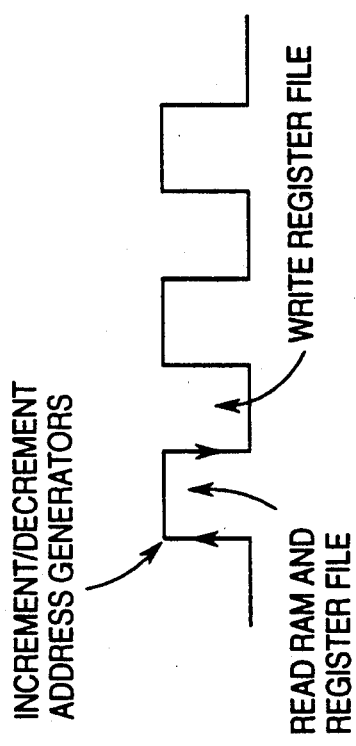
FIG. 6 is a diagram of the data transmission sequence with respect to the clock cycles.

In step 226, a timer is initiated to provide a counter for the 160 multiply-accumulates required by the generation of $\phi(0,1)$. Thus, MAC 32 starts accumulating the product of S(169) and S(168) with the product of S(168) and S(167), etc. Register file 20 is in a read/write mode where data is read from the location at which address generator 18 points during the first half of the clock cycle, and data is written to the location at which address generator 16 points on the second half of the clock cycle. This timing is shown in FIG. 6.

Therefore, on the first cycle of the generation of $\phi(0,1)$, S(169) is read from register file 20 and S(168) is read from RAM 12 in step 228. These values are multiplied and accumulated in MAC 32 in step 230. Then, in step 232, S(168) is written into register file 20 at location 8, pointed at by address generator 16. Next, in step 234, the pointers of address generators 14, 16, and 18 are decremented so that address generator 14 now points to location 167 in RAM 12 which holds the value S(167), address generator 18 now points to address 8 in register file 20 which holds the value S(168), and address generator 16 points at address 7 of register file 20 which holds the value S(167) from the generation of $\phi(0,0)$. In steps 236 and 238, the pointers of address generator 16 and address generator 18 wrap around if they have passed their wrap around limit. On the first cycle they have not, so execution proceeds to step 240. In step 240, the timer status is checked. If 160 iterations have not been completed, execution branches back to step 228.

On the second cycle of the generation of $\phi(0,1)$, in steps 228 to 240, MAC 32 multiplies S(167) from RAM 12 with S(168) from register file 20 and accumulates the product of that multiplication with the product of S(169) and S(168). This process continues until all the terms of $\phi(0,1)$ are generated and accumulated in MAC 32 (i.e. for 160 multiply accumulates). As mentioned earlier, during these calculations, address generators 16 and 18 decrement in synchronism, are offset by 1 location, and wrap around each time location 0 is reached. Also, the values in register file 20 are continually overwritten. However, since address generator 18 is effectively "ahead" of address generator 16, and address generator 18 always points to the next operand for the generation of $\phi(0,1)$, the generation of $\phi(0,1)$ is implemented efficiently.

At the completion of the timer, register file 20 will be configured as shown below.

| ADDRESS | AG18 | AG16 | DATA VALUE [S()] |
|---------|------|------|------------------|
| 0       | X    |      | S(10)            |
| 1       |      |      | S(11)            |
| 2       |      |      | S(12)            |
| 3       |      |      | S(13)            |
| 4       |      |      | S(14)            |
| 5       |      |      | S(15)            |
| 6       |      |      | S(16)            |
| 7       |      |      | S(17)            |
| 8       |      |      | S(18)            |
| 9       |      | X    | S(9)             |

The last term in the generation of $\phi(0,1)$ is S(10)S(9). Thus, the value S(10) is in the location of register file 20 currently pointed at by address generator 18, and the value S(9) has been written into location 9 of register file 20. The output register of MAC 32 now contains the value $\phi(0,1)$ and address generator 14 points at location 9 in RAM 12, which holds the value S(9).

At this point execution proceeds to step 242, in which $\phi(0,1)$ is written into RAM 48 via data bus 30 and the output register of MAC 32 is cleared. In step 244, address generator 14 and address generator 16 are decremented once more, allowing S(8) to be written from RAM 12 to location 8 of register file 20 (overwriting S(18)). In step 246 address generator 14 is then set to point at S(10) and the pointer of address generator 16 is exchanged with the pointer of address generator 18. Thus, address generator 14 now points at S(10) in location 10 of RAM 12, address generator 16 points at S(10) in location 0 of register file 20, and address generator 18 points at S(8) in location 8 of register file 20. Address generator 16 and address generator 18 can either be directly set to point at the desired locations or their address outputs can be switched by an address multiplexer (not shown). The pointers of address generator 16 and address generator 18 are now out of step by 2.

Generator 10 now generates $\phi(0,2)$ by the following equation:

$$\phi(0,2) = S(10)S(8) + S(11)S(9) + \ldots + S(169)S(167).$$

The configuration of register file 20 at the beginning of this generation is shown below:

| ADDRESS | AG18 | AG16 | DATA VALUE [S()] |
|---------|------|------|------------------|
| 0       |      | X    | S(10)            |
| 1       |      |      | S(11)            |
| 2       |      |      | S(12)            |
| 3       |      |      | S(13)            |
| 4       |      |      | S(14)            |
| 5       |      |      | S(15)            |
| 6       |      |      | S(16)            |
| 7       |      |      | S(17)            |
| 8       | X    |      | S(8)             |
| 9       |      |      | S(9)             |

In step 248, address generators 14, 16, and 18 are put in the increment mode. The configurations of multiplexers 24 and 26 remain unchanged. In step 250, a timer is started to provide 160 multiply-accumulates for the generation of $\phi(0,2)$. As in steps 228 to 240 of the generation of $\phi(0,1)$, in steps 252 to 260, MAC 32 multiply-accumulates the terms of $\phi(0,2)$, and register file 20 continually has its contents overwritten. Specifically, when address generator 18 is pointing to location 7 of register file 20, which contains S(17), address generator 16 is writing S(19) into location 9. On the previous clock cycle, S(18) was written into location 8, preparing for when address generator 18 would access location 8 two clock cycles later.

At the completion of the generation of $\phi(0,2)$, register file 20 is configured as shown below.

| ADDRESS | AG18 | AG16 | DATA VALUE [S()] |
|---|---|---|---|
| 0 | | | S(160) |
| 1 | | | S(161) |
| 2 | | | S(162) |
| 3 | | | S(163) |
| 4 | | | S(164) |
| 5 | | | S(165) |
| 6 | | | S(166) |
| 7 | X | | S(167) |
| 8 | | | S(168) |
| 9 | | X | S(169) |

The output register of MAC 32 contains $\phi(0,2)$. Execution continues at step 262 where the output of MAC 32 is stored in RAM 48 and the output register of MAC 32 is cleared.

Prior to the generation of $\phi(0,3)$, in step 264 the pointers of address generators 14, 18, and 16 are set to point at position 166 of RAM 12, position 9 of register file 20, and position 6 of register file 20 respectively. Thus, address generator 14 points at sample S(166), address generator 18 points at sample S(169), and address generator 16 points at sample S(166). The pointers of address generator 16 and address generator 18 can be set by directly setting their respective pointers to the locations indicated or by decrementing the pointer of address generator 18 by 1 and switching its pointer with that of address generator 16 through an address multiplexer (not shown).

In step 266 it is determined whether all row 0 elements have been generated. Since they have not, execution proceeds back at step 224. In step 224, address generators 14, 16, and 18 are placed in decrement mode. Thus, at the beginning of the generation of $\phi(0,3)$, register file 20 will be configured as shown below.

| ADDRESS | AG18 | AG16 | DATA VALUE [S()] |
|---|---|---|---|
| 0 | | | S(160) |
| 1 | | | S(161) |
| 2 | | | S(162) |
| 3 | | | S(163) |
| 4 | | | S(164) |
| 5 | | | S(165) |
| 6 | | X | S(166) |
| 7 | | | S(167) |
| 8 | | | S(168) |
| 9 | X | | S(169) |

The covariance matrix element $\phi(0,3)$ is then generated according to steps 226 to 242 described above. Specifically, in step 226 a timer is again started to provide 160 multiply-accumulates. When the 160 multiply-accumulates are completed, the output of MAC 32 has the value $\phi(0,3)$, which, according to step 242, is then stored in RAM 48. The output register of MAC 32 is then cleared. At the completion of the generation of $\phi(0,3)$, register file 20 is configured as shown below.

| ADDRESS | AG18 | AG16 | DATA VALUE [S()] |
|---|---|---|---|
| 0 | X | | S(10) |
| 1 | | | S(11) |
| 2 | | | S(12) |

-continued

| ADDRESS | AG18 | AG16 | DATA VALUE [S()] |
|---|---|---|---|
| 3 | | | S(13) |
| 4 | | | S(14) |
| 5 | | | S(15) |
| 6 | | | S(16) |
| 7 | | X | S(7) |
| 8 | | | S(8) |
| 9 | | | S(9) |

After the generation of $\phi(0,3)$, address generator 14 and address generator 16 are decremented according to step 244, allowing S(6) to be written into location 6. In step 246, address generator 14 is then reset to point to location 10 of RAM 12 and the pointers of address generators 16 and 18 are exchanged. Thus, at the beginning of the generation of $\phi(0,4)$, address generator 14 points at S(10), address generator 16 points at S(10), and address generator 18 points at S(6). In step 248, address generators 14, 16, and 18 are now placed in increment mode.

This sequence of operations is repeated until the last element of row 0 of the covariance matrix, $\phi(0,10)$, is generated. Specifically, at the completion of the generation of $\phi(0,9)$, execution will be at step 244 and register file 20 will be configured as shown below:

| ADDRESS | AG18 | AG16 | DATA VALUE [S()] |
|---|---|---|---|
| 0 | X | | S(10) |
| 1 | | X | S(1) |
| 2 | | | S(2) |
| 3 | | | S(3) |
| 4 | | | S(4) |
| 5 | | | S(5) |
| 6 | | | S(6) |
| 7 | | | S(7) |
| 8 | | | S(8) |
| 9 | | | S(9) |

As before, in step 244 address generator 14 and address generator 16 are decremented so that address generator 16 points at location 0, and S(0) is written into location 0 of register file 20. In step 246, address generator 14 is then reset to S(10) and address generators 16 and 18 are exchanged (both are pointing at address 0). In step 248, address generators 14, 16, and 18 are then set to increment mode. The last matrix row 0 element, $\phi(0,10)$, is then generated according to the equation:

$$\phi(0,10)=S(10)S(0)+S(11)S(1)+\ldots+S(169)S(159).$$

Specifically, address generator 14 points at S(10) in RAM 12 and both address generators 16 and 18 point at S(0) in location 0 of register file 20. Since generator 10 is configured so that on any given clock cycle, reads occur before writes, in step 252 S(0) is first read from location 0 of register file 20, and then S(10) is written over S(0) at location 0 of register file 20. At the completion of the generation of $\phi(0,10)$, the output of MAC 32 is stored in RAM 48 and the output of MAC 32 is cleared according to step 262. Step 264 may optionally be skipped during this last cycle as the pointers of address generators 14, 16 and 18 will be set to new values at the initiation of step 56.

Step 54 is now complete and the covariance matrix elements $\phi(0,0)$ to $\phi(0,10)$ have been generated and stored. During step 56, the remaining elements of the main diagonal of the covariance matrix, $\phi(1,1)$ to $\phi(10,10)$, are generated according to Equation 2. Specifically, $\phi(1,1)$ is generated according to the following formula:

$$\phi(1,1)=\phi(0,0)+S(9)S(9)-S(169)S(169).$$

A discussion of the implementation of steps 56 and 58 will be made in reference to FIG. 9, which shows an expanded embodiment of a covariance matrix generator 100. It will be readily apparent to one skilled in the art that steps 52 and 54 may be implemented by generator 100 as described above with respect to generator 10. In the discussion of steps 56 and 58, it is assumed that steps 52 and 54 have been executed by generator 100 as described above.

Figure 9:
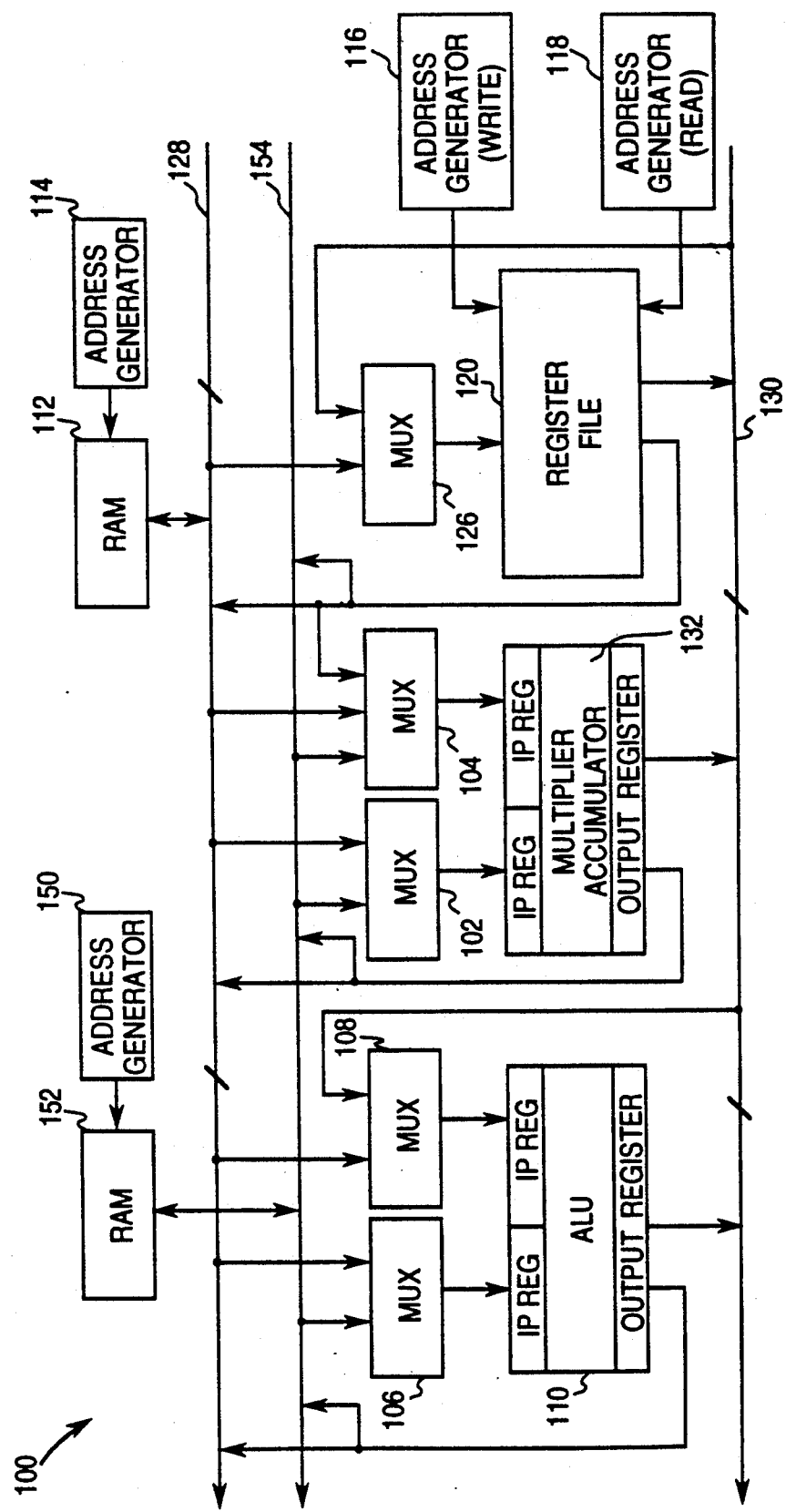
FIG. 9 is a block diagram of an expanded covariance matrix generator according to another aspect of the present invention.

Referring to FIG. 9, covariance matrix generator 100 is shown according to an exemplary embodiment of the present invention. Generator 100 generally includes a plurality of random access memories (RAM) 112 and 152, a plurality of address generators 114, 116, 118, and 150, a dual-port register file 120, and a plurality of multiplexers 102, 104, 106, 108, and 126. Generator 100 further includes three data busses 128, 130 and 154, a multiply accumulator (MAC) 132 and an arithmetic logic unit (ALU) 110 whose output register can hold the ALU output or transparently pass it to data bus 130.

Figure 10A:
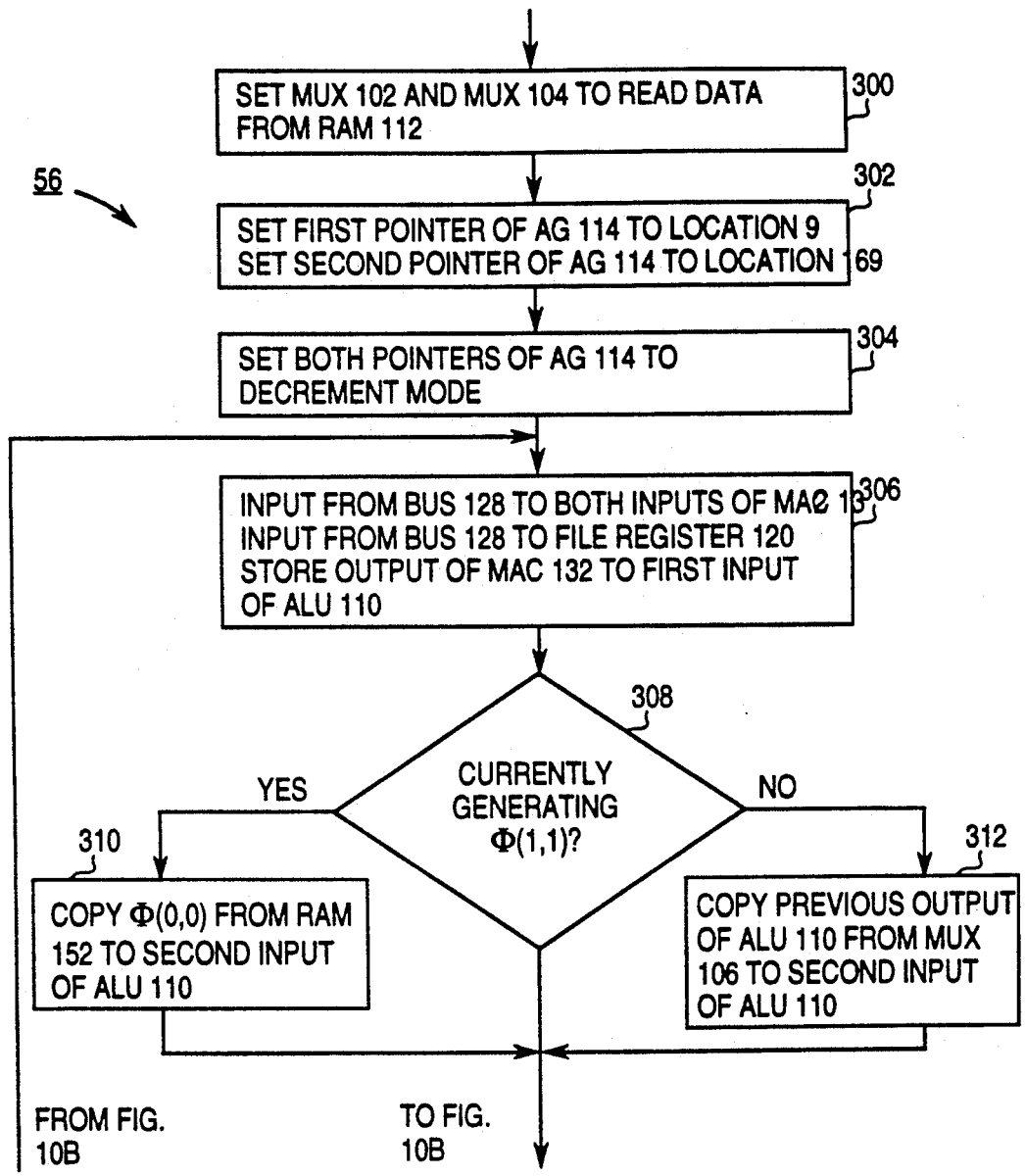
FIGS. 10A–10B are a flowchart of the process for generating the main diagonal of a covariance matrix.
Figure 10B:
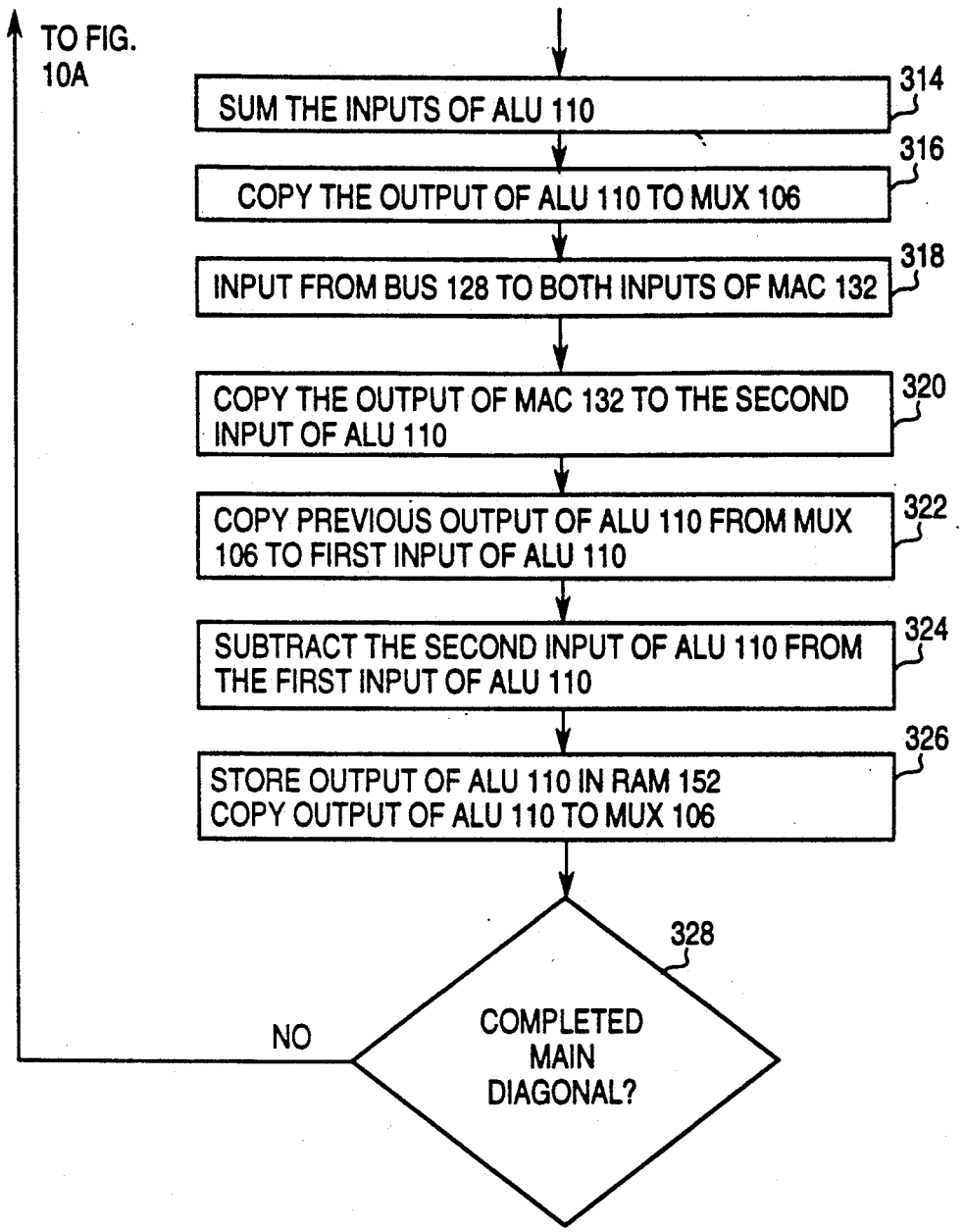
Figure 11A:
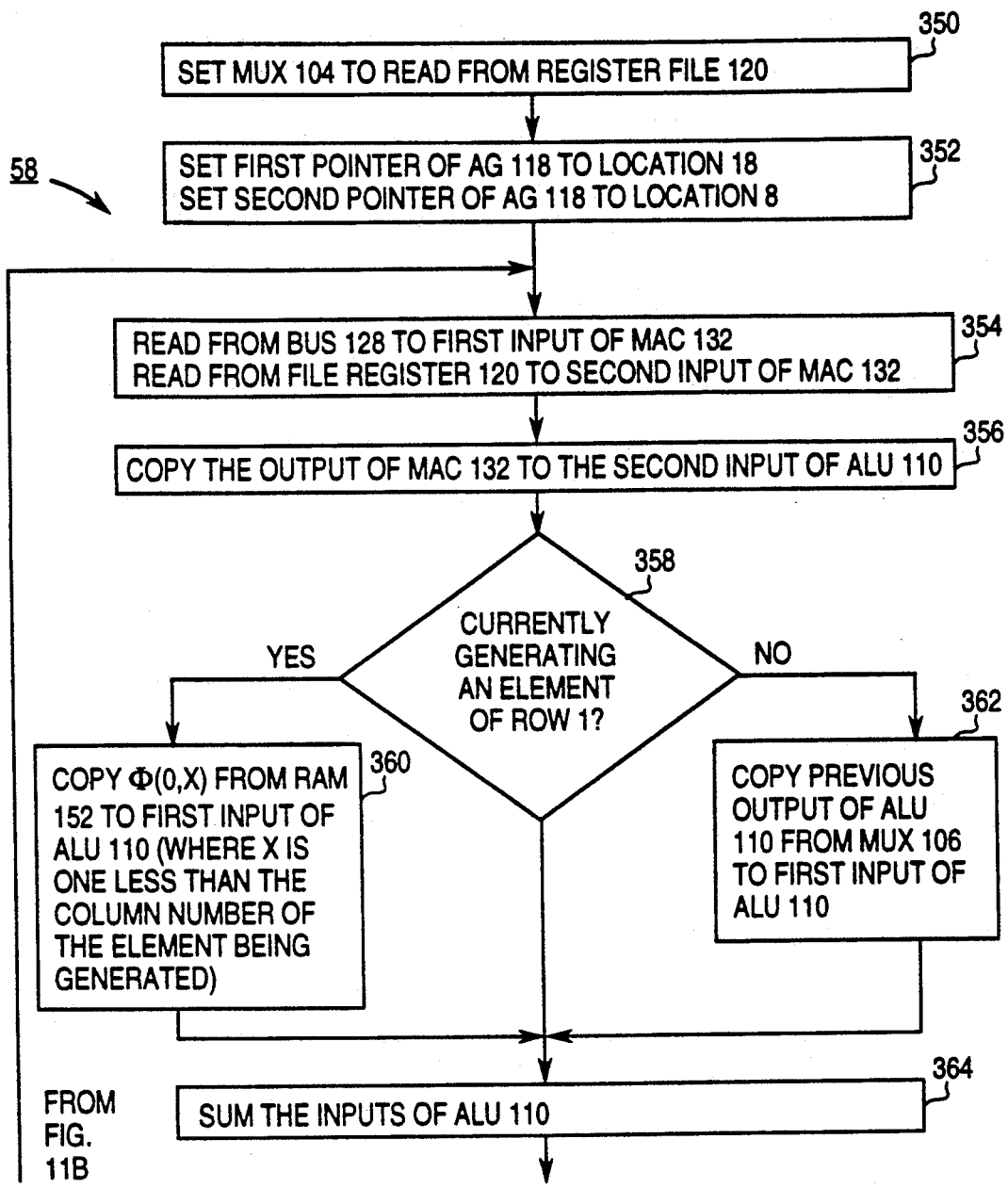
FIGS. 11A–11B are a flowchart of the process for generating the remaining elements of a covariance matrix.
Figure 11B:
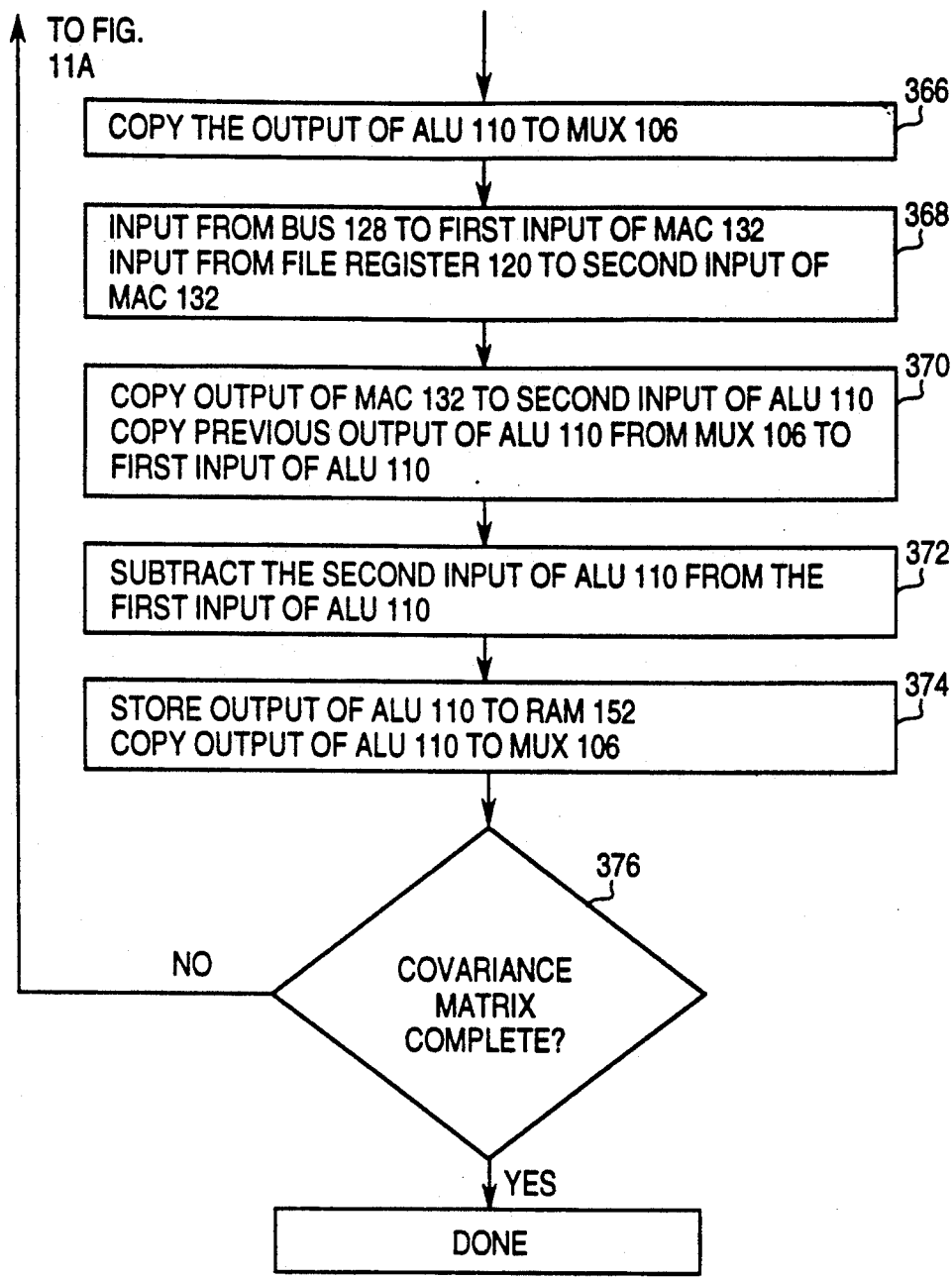

MAC 132 has two input ports and an output port and is designed as a 3-level pipeline similar to MAC 32 discussed above. One input to MAC 132 is controlled by multiplexer 102, while the other is controlled by multiplexer 104. At the start of step 56, the specific operation of which is shown in FIGS. 10A and 10B, both multiplexer 102 and multiplexer 104 are configured to direct data from data bus 128 to MAC 132 according to step 300.

Register file 120 is configured as a circular buffer with a depth of 20 locations. Address generator 118 is the "read" address generator of register file 120, and address generator 116 is the "write" address generator of register file 120. Address generators 116 and 118 are designed to allow their respective address pointers to "wrap-around," as described above. Multiplexer 126 controls the input to register file 120, and is configured to direct data from data bus 128 to the location of register file 120 pointed at by address generator 116.

ALU 110 has two inputs which are controlled by multiplexer 106 and multiplexer 108. During steps 56 and 58, ALU 110 is used to accumulate the outputs of MAC 132. Thus, at the completion of step 54, MAC 132 is placed in multiply-only mode.

Address generator 114 is the address generator of RAM 112 and is configured with two modifiable pointers. In step 302, the first modifiable pointer of address generator 114 is initially set to point at location 9 of RAM 112, and the second address pointer of address generator 114 is initially set to point at location 169 of RAM 112. In step 304, both address pointers of address generator 114 are initially set to decrement mode. Address generator 114 is further configured to allow each of its two pointers to drive address bus 128 on alternate clock cycles, as illustrated below:

| Cycle | POINTER 1 DATA | POINTER 2 DATA | Cycle |
|---|---|---|---|
| 1 | S(9) | S(169) | 2 |
| 3 | S(8) | S(168) | 4 |
| 5 | S(7) | S(167) | 6 |
| 7 | S(6) | S(166) | 8 |
| 9 | S(5) | S(165) | 10 |

-continued

| Cycle | POINTER 1 DATA | POINTER 2 DATA | Cycle |
|---|---|---|---|
| 11 | S(4) | S(164) | 12 |
| 13 | S(3) | S(163) | 14 |
| 15 | S(2) | S(162) | 16 |
| 17 | S(1) | S(161) | 18 |
| 19 | S(0) | S(160) | 20 |

Consequentially, data bus 128 will sequentially provide the values S(9), S(169), S(8), S(168), . . . , S(0), S(160). Configured as specified above, generator 100 begins the generation of diagonal elements $\phi(1,1)$ to $\phi(10,10)$. Specifically, in step 306, both inputs of MAC 132 are successively fed the values S(9), S(169), . . . , S(0), S(160) from data bus 128. Thus, MAC 132 successively outputs the products S(9)S(9), S(169)S(169), . . . , S(0)S(0), S(160)S(160). By reading data bus 128 during alternate executions of step 306 file register 120 inputs the values S(0) to S(9).

Also during step 306, the outputs of MAC 132 are fed sequentially to multiplexer 108 of ALU 110 via data bus 130. In steps 308 and 310, RAM 152 supplies $\phi(0,0)$, in the first instance, to multiplexer 106 from RAM 152 via data bus 154. Three clock cycles after S(9) is fed into both inputs of MAC 132, MAC 132 outputs S(9)S(9). On the next clock cycle, S(9)S(9) is added to $\phi(0,0)$ in ALU 110 according to step 314. The sum of $\phi(0,0)$ and S(9)S(9) becomes available at the output of ALU 110 on the same cycle. In step 316, this sum is passed to multiplexer 106 via data bus 154 for subsequent access. The output of ALU 110, although connected to data bus 130, is isolated from data bus 130 during this process. In step 318, MAC 132 generates S(169)S(169), which, in step 320, is transmitted to multiplexer 108. The output of ALU 110 is fed directly to data bus 154, and therefore to multiplexer 106 according to step 322. On the 5th cycle, the product S(169)S(169) is input to multiplexer 108 from the output of MAC 132 via data bus 130 according to step 320, and in step 324 ALU 110 subtracts this value from the previous accumulation. This operation yields $\phi(0,0)+S(9)S(9)-S(169)S(169)$, which equals $\phi(1,1)$. During cycle 5, the output of ALU 110 becomes available on data bus 154, is written into RAM 152 in step 326, and is simultaneously applied to multiplexer 106 for use in generating $\phi(2,2)$ according to the equation shown below:

$$\phi(2,2)=\phi(1,1)+S(8)S(8)-S(168)S(168).$$

In step 328, it is determined whether the main diagonal has been completed. As it has not, execution begins again at step 306.

Since the products S(8)S(8) and S(168)S(168) are the next two outputs from MAC 132, the process just described with reference to steps 306 to 328 is repeated without a break in the pipeline of MAC 132 until $\phi(10,10)$ is generated and stored in RAM 152. Data busses 128, 130, and 154 are all utilized in this operation without conflict.

As shown earlier, at the completion of step 54, register file 120 contains the values S(160) to S(169) in ten of its locations. Additionally, during execution of step 56, the values S(0) to S(9) are transferred to the remaining ten locations of register file 120. As shown, no overhead is incurred in this transfer since the values S(0) to S(9) are accessed from RAM 112 over data bus 128 during the generation of $\phi(1,1)$ to $\phi(10,10)$. Further, at the end of step 56, RAM 152 will contain $\phi(0,0)$ from step 52, $\phi(0,1)$ to $\phi(0,10)$ from step 54, and $\phi(1,1)$ to $\phi(10,10)$ from step 56.

Because the values S(0) to S(10) were transferred to register file 120 during step 56, register file 120 is configured with the appropriate values to supply one input to MAC 132 during step 58. Consequently, in step 350 multiplexer 104 is configured to access data from register file 120. As during step 56, during step 58 the other input to MAC 132 is supplied directly from RAM 112 over data bus 128. Thus, the pipeline of MAC 132 is kept full.

To generate $\phi(1,2)$ and subsequent diagonal values, the values stored in register file 120 must be used. There is still no conflict on the data busses since register file 120 can supply one of the inputs to MAC 132 via multiplexer 104. As in step 56, the output of register file 120 is connected to but isolated from data bus 130.

To implement step 58, during which the values $\phi(1,2)$ to $\phi(9,10)$ will be generated, address generator 118 of register file 120 is configured with two pointers, both of which are able to be decremented. Again, address generator 114 has two address pointers which supply values S(169) to S(161) and S(9) to S(1) to data bus 128 on alternate cycles.

In step 352, the pointers of address generator 118 of register file 120 are configured to supply values S(168) to S(160) and S(8) to S(0) on alternate cycles.

Thus, during step 354 RAM 112 is supplying one input to MAC 132 with the values S(9), S(169), S(8), S(168), ..., S(1), S(161), using data bus 128 and multiplexer 102, while register file 120 is supplying the other input of MAC 132 with values S(8), S(168), S(7), S(167), ..., S(0), S(160), using multiplexer 104. The sequential outputs from MAC 132 (which is still configured to multiply only) are:

S(9)S(8), S(169)S(168), ..., S(1)S(0), S(161)S(160)

ALU 110 is fed the value $\phi(0,1)$ from RAM 152 via multiplexer 106 and the output of MAC 132, S(9)S(8), via multiplexer 108 according to steps 356 to 360. ALU 110 adds these values. In steps 366 to 370, ALU 110 is then fed the sum of its last calculation and the next output of MAC 132, S(169)S(168), and, in step 372, subtracts the latter from the former, yielding $\phi(1,2)$. In step 374 $\phi(1,2)$ is stored in RAM 152. This process is repeated according to the steps shown in FIGS. 11A to 11B, with the pointers of RAM 112 and register file 120 being changed appropriately until, as determined in step 376, all of the elements of the upper triangular section of the covariance matrix have been generated. During this process, the pipeline of MAC 132 is kept full and all the diagonal elements $\phi(1,2)$ to $\phi(9,10)$ are efficiently generated and stored in RAM 152 from the output of ALU 110 via data bus 154.

The number of machine cycles to complete steps 52 and 54 using generator 100 is approximately 1,763. Specifically, the generation of $\phi(0,0)$ to $\phi(0,10)$ requires eleven 160 multiply-accumulates and 3 pipeline cycles, which equals 1,763 cycles. Additional cycles may also be required for the address generation and reset overhead.

The penalty for steps 52 and 54 is three pipeline cycles because the final addresses to generate $\phi(0,0)$ are provided to register file 120 and RAM 112 three cycles before $\phi(0,0)$ is available for storage in RAM 152. However, this three cycle delay may be used to minimize address generation overhead. In particular, during the 3 cycle delay, the address pointers for RAM 112 and register file 120 can be reset to the values required to begin the computation of the next covariance element.

Step 56, during which the elements $\phi(1,1)$ to $\phi(10,10)$ are generated, requires approximately twenty multiply operations with the ALU add/subtracts occurring in parallel with the multiple pipeline operation.

Step 58, during which the remainder of the covariance matrix is generated, requires approximately 110 multiplies and three pipeline cycles. Therefore, the generation of a covariance matrix on generator 100 requires a total of only 1,876 cycles plus any address generator reset overhead.

If MAC 132 is modified to allow for accumulating multiplies while outputing multiplies, the above-described method of generating a covariance matrix may be modified to provide for a savings of approximately 55 cycles. Specifically, rather than generating the row 0 elements, $\phi(0,0)$ to $\phi(0,10)$, separately from their respective diagonal elements, MAC 132 can be configured to generate the diagonal elements while it is generating the row 0 elements, thus avoiding 55 redundant calculations.

For example, the products S(10)S(10) to S(169)S(169) are calculated during the computation of $\phi(0,0)$, as shown below:

$$\phi(0,0) = S(10)S(10) + S(11)S(11) + \cdots + S(169)S(169).$$

However, ten of the factors used in the generation of $\phi(0,0)$, S(160)S(160) to S(169)S(169), are also factors required to generate diagonal elements $\phi(1,1)$ to $\phi(10,10)$, as shown below:

$\phi(1,1) = \phi(0,0) + S(9)S(9) - S(169)S(169).$
$\phi(2,2) = \phi(1,1) + S(8)S(8) - S(168)S(168).$
.
.
.
$\phi(10,10) = \phi(9,9) + S(0)S(0) - S(160)S(160).$ Rather than calculate each of the values S(160)S(160) to S(169)S(169) twice, these redundant calculations may be avoided by modifying the above-described method for generating the covariance matrix as follows:

Covariance element $\phi(0,0)$ is generated as described above, except that address generator 114 is set to initially point at location 0 in RAM 112, which contains S(0), and the timer is set to provide 170, rather than 160, operations. During the first ten clock cycles, S(0)S(0) to S(9)S(9) are generated by MAC 132 but are not accumulated. Instead, these 10 parameters are immediately output from MAC 132 and stored in RAM 152 via data bus 154. Since data bus 154 is otherwise only used in step 52 to store the final generated element into RAM 48, no bus conflicts occur.

After S(0)S(0) to S(9)S(9) are stored, $\phi(0,0)$ is generated as described earlier. However, when the last ten factors in the generation of $\phi(0,0)$, S(160)S(160) to S(169)S(169), are available from MAC 132, they too are stored in RAM 152 via data bus 154. Once $\phi(0,0)$ has been generated and stored, RAM 48 contains $\phi(0,0)$, S(0)S(0) to S(9)S(9), and S(160)S(160) to S(169)S(169). Therefore, RAM 48 contains all the necessary data to generate the diagonal elements $\phi(1,1)$ to $\phi(10,10)$.

During the generation of the next element in row 0 of the matrix, $\phi(0,1)$, ALU 110 may access the data stored in RAM 152 via data bus 154 at any time except when the generation of a new row 0 element has been completed, during the storage of the first group of multiplies, and during the storage of the last group of multiplies, without a bus conflict.

Specifically, while generating $\phi(0,1)$, MAC 132 uses data bus 154 during the first 9 cycles of operation to store the values S(1)S(0) to S(9)S(8) in RAM 152, does not use data bus 154 for the next 150 cycles while accumulating S(10)S(9) to S(160)S(159), and once again uses data bus 154 to store the last nine factors of $\phi(0,1)$, S(161)S(160) to S(169)S(168), in RAM 152. During the 150 cycle lull when data bus 154 and RAM 152 are not used by MAC 132, ALU 110 can make use of data bus 154 and RAM 152 to generate $\phi(1,1)$ to $\phi(10,10)$, the remaining elements in the first diagonal of the covariance matrix. Thus, while MAC 132 is generating $\phi(0,1)$, ALU 110 employs data bus 154 and RAM 152 to compute $\phi(1,1)$ to $\phi(10,10)$ and store the results back in RAM 152.

The generation of each of diagonal element requires four cycles, thus the generation of $\phi(1,1)$ to $\phi(10,10)$ will take $10 \times 4 = 40$ cycles. These generations therefore can easily be completed during the 150 cycle lull, during which MAC 132 does not require the use of data bus 154 or RAM 152 for the generation of $\phi(0,1)$. Since S(160)S(160) to S(169)S(169) are stored during the generation of $\phi(0,0)$, the redundant calculation of these values for the generation of $\phi(1,1)$ to $\phi(10,10)$ is avoided, giving a savings of 10 multiplies.

This process is repeated until all elements of the covariance matrix are generated. For example, while $\phi(0,1)$ is being generated in MAC 132, the diagonal elements $\phi(1,1)$ to $\phi(10,10)$ are generated by ALU 110 and stored in RAM 152, and the values S(1)S(0) to S(9)S(8) and S(161)S(160) to S(169)S(168) are also stored in RAM 152. These values are then used by ALU 110 to generate the elements of the next diagonal, $\phi(1,2)$ to $\phi(9,10)$, while $\phi(0,3)$ is being generated in MAC 132.

Thus, MAC 132 and ALU 110 operate in parallel, making efficient use of the resources of generator 100. These modifications are easily implemented, as they use the same addressing schemes as described above. Overall, the above described modification yields saving of 10 cycles on the first pass, 9 on the second pass, 8 on the third, etc., making a total saving of 55 cycles.

Thus, the pipeline capabilities of the architecture are fully exploited and parallel processing occurs which exploits the existence of multiple functional units. Specifically, register file 120, ALU 110, MAC 132 and RAMs 112 and 152 all operate in parallel to give high performance in implementing the covariance matrix computation for VSELP.

While specific embodiments of the invention have been described and illustrated, it will be clear that variations in the details of the embodiments specifically illustrated and described may be made without departing from the true spirit and scope of the invention as defined in the appended claims. For example, the exemplary embodiments of the invention discussed above are described in terms of an 11 by 11 matrix based on 170 sample values. However, the generator architecture and generation methods disclosed herein are readily modifiable to generate covariance matrices of any dimension based on any number of input samples.

What is claimed is:

1. An apparatus for generating a first row of a covariance matrix, the apparatus comprising:
   a memory containing an array of values representative of a plurality of samples;
   a circular buffer coupled to the memory, the circular buffer being configured to provide a predetermined number of memory locations;
   a multiply-accumulator coupled to the memory and the circular buffer;
   means for transmitting a sequential subset of the array of values from the memory to the multiply-accumulator to generate a first element of the first row of the covariance matrix; and
   means for simultaneously transmitting to the multiply-accumulator a first series of sequential subsets of the array of values from the memory, and a second series of sequential subsets of the array of values from the circular buffer, to generate the remaining elements of the first row of the covariance matrix.

2. The apparatus of claim 1 wherein the circular buffer comprises a dual port register file, the register file comprising a read address generator and a write address generator, the address generators being configured to wrap around.

3. An apparatus for generating an upper or lower triangular portion of a covariance matrix, the apparatus comprising:
   first and second memories, the first memory containing an array of values representative of a plurality of samples;
   a circular buffer coupled to the first memory, the buffer being initially configured to provide a first predetermined number of memory locations;
   a multiply-accumulator coupled to the first and second memories and the circular buffer;
   an arithmetic logic unit coupled to the second memory and the multiply-accumulator; and
   means for transmitting a sequential subset of the array of values from the first memory to the multiply-accumulator to generate a first element of the first row of the covariance matrix;
   means for storing the first element of the first row of the covariance matrix in the second memory;
   means for simultaneously transmitting to the multiply-accumulator a first series of sequential subsets of the array of values from the first memory, and a second series of sequential subsets of the array of values from the circular buffer, to generate in the output of the multiply-accumulator the remaining elements of the first row of the covariance matrix;
   means for storing the remaining elements of the first row of the covariance matrix in the second memory;
   means for generating in the arithmetic logic unit the remaining elements of the upper or lower triangular portion of the covariance matrix; and
   means for storing in the second memory the remaining elements of the upper or lower triangular portion of the covariance matrix.

4. The apparatus of claim 3 wherein the circular buffer comprises a dual port register file having a read address generator and a write address generator, the address generators being configured to wrap around.

5. The apparatus of claim 3 wherein the means for generating in the arithmetic unit comprises means for selectively applying data from the first memory and the circular buffer file to the multiplier-accumulator and means for selectively applying data from the second memory and the multiplier-accumulator to the arithmetic logic unit.

6. The apparatus of claim 3 wherein the remaining elements of the upper or lower triangular portion of the covariance matrix are generated in the arithmetic logic unit while the first row of the covariance matrix is being generated, and wherein the means for generating in the arithmetic unit comprises means for selectively applying data from the second memory to the arithmetic logic unit.

7. A method of generating a covariance matrix comprising the steps of:
 providing a memory containing an array of values representative of a plurality of samples;
 providing a multiply-accumulator;
 providing a circular buffer with a predetermined depth;
 generating a first element of a first row of the covariance matrix in the multiply-accumulator;
 storing the first element in a second memory;
 generating the remaining elements of the first row of the covariance matrix;
 storing the remaining elements of the first row in the second memory;
 generating, diagonal by diagonal, the remaining elements of the upper or lower triangular portion of the covariance matrix in an arithmetic logic unit; and
 storing in the second memory the remaining elements of the upper or lower triangular portion of the covariance matrix.

8. The method of claim 7 wherein the step of generating a first element of comprises the step of transmitting a sequential subset of the array of values from the first memory to the multiply-accumulator.

9. The method of claim 7 wherein the step of generating the remaining elements of the first row comprises the step of transmitting a first series of sequential subsets of the array of values from the first memory to the multiply-accumulator, while simultaneously transmitting a second series of sequential subsets of the array of values from the circular buffer to the multiply-accumulator.

10. The method of claim 7 wherein the step of generating, diagonal by diagonal, the remaining elements of the upper or lower triangular portion of the covariance matrix, is performed simultaneous with the step of generating the remaining elements of the first row of the covariance matrix.

11. A method of generating a first row of elements of a covariance matrix comprising the steps of:
 providing a first memory containing an array of values representative of a plurality of samples;
 providing a multiply-accumulator;
 providing a circular buffer with a predetermined depth;
 generating a first element of the first row of the covariance matrix in the multiply-accumulator by successively inputting a sequential subset of the array of values from the first memory into the multiply-accumulator;
 storing the first element in a second memory;
 generating the remaining elements of the first row of the covariance matrix by successively inputting a first series of sequential subsets of the array of values from the first memory into the multiply-accumulator, while simultaneously inputting a second series of sequential subsets of the array of values from the circular buffer into the multiply-accumulator; and
 storing the remaining elements of the first row in the second memory.

12. A method for generating a first row of an upper or lower triangular portion of a covariance matrix comprising the steps of:
 providing a memory containing an array of values representative of a plurality of samples;
 providing a multiply-accumulator;
 providing a circular buffer with a predetermined depth;
 generating a first element in the first row by simultaneously applying, to the multiply-accumulator and to the circular buffer, a series of the values from the memory;
 generating each of the remaining elements of the first row by simultaneously executing the steps of:
 applying to the multiply-accumulator and the circular buffer a first series of the values from the memory; and
 applying to the multiply-accumulator a second series of the values from the circular buffer.

13. A method for generating a triangular portion of a covariance matrix, the triangular portion defining a first row of elements and a plurality of diagonal arrays of elements, comprising the steps of:
 providing a first memory and a second memory, the first memory containing a plurality of values representative of samples;
 providing a multiply-accumulator;
 providing a circular buffer with a predetermined depth;
 generating a first element in the first row by simultaneously applying, to the multiply-accumulator and to the circular buffer, a series of the values from the first memory;
 storing in the second memory the first element of the first row;
 generating each of the remaining elements of the first row by simultaneously applying to the multiply-accumulator a first series of the values from the first memory, and a second series of the values from the circular buffer;
 storing each of the remaining elements of the first row in the second memory;
 providing an arithmetic logic unit;
 generating, diagonal by diagonal, the remaining elements of each diagonal array in the arithmetic logic unit; and
 storing the remaining elements of each of the diagonal arrays in the second memory.

14. A covariance matrix generator, comprising:
 a multiply-accumulator having two input registers and an output register;
 a first and a second multiplexer, said first multiplexer being coupled to one input register of said multiply-accumulator, said second multiplexer being coupled to the other input register of said multiply accumulator;
 a dual port register file having a read address generator and a write address generator, the output of said register file being coupled to said second multiplexer;
 a third multiplexer coupled to the input of said register file;

an arithmetic logic unit having two input registers and an output register;

a fourth and a fifth multiplexer, said fourth multiplexer being coupled to one input register of said arithmetic logic unit, said fifth multiplexer being coupled to the other input register of said arithmetic logic unit;

a first data bus coupled to said first, second, third, fourth, and fifth multiplexers, said first data bus being further coupled to the output register of said multiply accumulator, the output register of said ALU, and the output of said file register;

a second data bus coupled said first, second, and fourth multiplexers, said second data bus being further coupled to the output register of said multiply-accumulator, the output register of said arithmetic logic unit, and the output of said register file;

a third data bus coupled to said third multiplexer and said fifth multiplexer, said third data bus being further coupled to the output register of said multiplier accumulator, the output register of said arithmetic logic unit, and the output of said register file;

a first memory having an address register, said first memory being coupled to said first data bus; and a second memory having an address register, said second memory being coupled to said second data bus.

* * * * *